United States Patent [19]

Nishimura

[11] Patent Number: 5,469,885
[45] Date of Patent: Nov. 28, 1995

[54] BLOCK VALVE WITH TANK CHAMBER

[75] Inventor: Ryutaro Nishimura, Osaka, Japan

[73] Assignee: Masako Kiyohara, Kumamoto, Japan

[21] Appl. No.: 326,852

[22] Filed: Oct. 21, 1994

[30] Foreign Application Priority Data

Oct. 27, 1993 [JP] Japan ................................. 5-268690

[51] Int. Cl.⁶ ........................................... F16K 11/10
[52] U.S. Cl. ........................................ 137/568; 137/883
[58] Field of Search ................................ 137/240, 568, 137/593, 883

[56] References Cited

U.S. PATENT DOCUMENTS

| 4,714,091 | 12/1987 | Wagner | 137/884 |
| 4,953,826 | 9/1990 | Ohmi et al. | 251/331 |
| 5,137,047 | 8/1992 | George | 137/240 |
| 5,224,513 | 7/1993 | Bertone | 137/240 X |

*Primary Examiner*—John C. Fox
*Attorney, Agent, or Firm*—Griffin, Butler, Whisenhunt & Kurtossy

[57] ABSTRACT

A valve body is provided with a gas feed passage having an inlet and an outlet, a tank chamber, and a branch passage having a first portion connected between the gas feed passage and the tank chamber and an outlet extending from the tank chamber to a side of the valve body. A first valve is mounted on the valve body and selectively opens and closes the gas feed passage at a point downstream of the junction of the branch passage with the gas feed passage. A second valve is mounted on the valve body and selectively opens and closes the branch passage at a point between the tank chamber and the junction of the branch passage and the gas feed passage. A vacuum pump is provided to evacuate the tank chamber. When the first valve is open and the second valve is closed, gas may flow from an inlet pipe, through the gas feed passage and the first valve to a semiconductor process chamber. When the first valve is closed and the second valve is opened, residual gas in piping upstream of the inlet is evacuated through the branch passage and the second valve by the vacuum in the tank chamber. The first valve isolates the process chamber while the residual gas is being evacuated from the upstream piping.

12 Claims, 5 Drawing Sheets

BLOCK VALVE WITH TANK CHAMBER

FIELD OF THE INVENTION

The present invention relates to block valves of the type used in gas piping system for piping various gases into the process chamber of a semiconductor manufacturing apparatus. More particularly, the invention provides a block valve with a tank chamber that may be evacuated so that when the block valve is interposed in a gas feed line extending between conventional block valves and a process chamber, residual gases upstream of the point of interposition may be quickly evacuated from the system.

BACKGROUND OF THE INVENTION

In the process of forming thin films on a wafer, different gases must be successively introduced into a vacuum chamber where the films are deposited on the wafer. The different gases are introduced into the chamber through a gas feed piping system which must be cleared of the residual portion of one gas before another gas is introduced. In a typical prior art gas feed piping system as illustrated in FIG. 6, different gases $G_1$, $G_2$, $G_3$, $G_4$ and $G_5$, are applied to the process chamber through a pipe 44 by selectively opening block valves 40 one at a time. Block valves permit the internal volume of the piping passages to be smaller than if single valves are used. This has the advantage of making it easier to replace gas in the piping and generation of particles can be reduced.

In changing over from a first gas to a second gas, the prior art piping system employs a vacuum pump 43 connected to the piping incorporating the block valves, the vacuum pump being connected through a branch pipe 41 and a valve 42 to a point downstream of the block valves. The changeover is accomplished by closing the block valve 40 supplying the first gas and then opening the valve 42 so that vacuum pump 43 may evacuate the residual portion of the first gas from the system. However, if the inner volume of the piping is relatively large, the degree of vacuum in branch pipe 41 drops sharply when valve 42 is opened. Furthermore, the pressure in the piping at the time of changeover is near atmospheric pressure and it takes a considerable interval of time for pump 43 to lower the pressure in the piping to the desired degree of vacuum even if the pump is of large capacity. Accordingly, the prior art system using the pump 43 alone to remove the residual gas, is not capable of quickly and smoothly evacuating the piping.

SUMMARY OF THE INVENTION

An object of the present invention is to provide a block valve with a tank chamber, the tank chamber acting to evacuate gas from piping upstream of the location where the valve is installed in the piping.

Another object of the invention is to provide a block valve comprising a valve body having formed therein a tank chamber, a gas feed passage having a gas feed inlet and a gas feed outlet, a branch passage having a portion connecting the gas feed passage to the tank chamber and a branch outlet extending from the tank chamber to a side of the valve body, a first valve mounted on the valve body for selectively opening and closing the gas feed passage at a point downstream of where the branch passage connects with the gas feed passage, and a second valve mounted on the valve body for selectively opening and closing the branch passage at a point between the tank chamber and where the branch passage connects with the gas feed passage.

A further object of the invention is to provide a block valve as described above in combination with means for evacuating the tank chamber through the branch passage outlet.

Still another object of the invention is to provide a block valve as described above in combination with means for continuously evacuating the tank chamber.

Yet another object of the invention is to provide a block valve as described above in combination with means for evacuating the tank chamber to thereby produce a vacuum at the gas feed passage inlet when the second valve opens the branch passage.

In a preferred embodiment of the invention, the first and second valves are diaphragm valves having metal diaphragms directly contacting the valve seats, and the valves are preferably actuated by fluid actuators.

Other objects and advantages of the invention and the manner of making and using it will become obvious upon consideration of the following description and the accompanying drawings.

DESCRIPTION OF THE INVENTION

Figure 1:
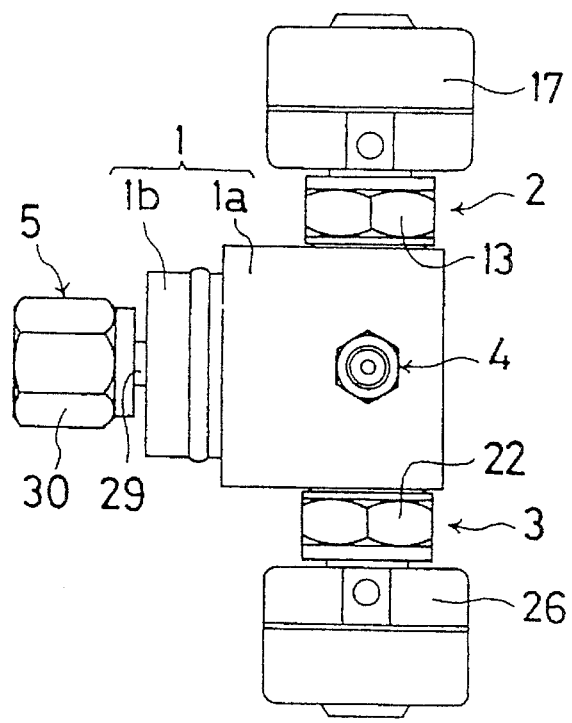
FIG. 1 is a front view of a block valve with a tank chamber.
Figure 2:
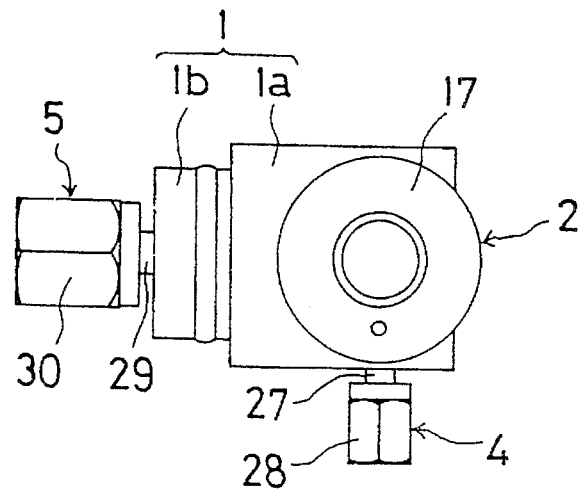
FIG. 2 is a plan view of the valve.
Figure 3:
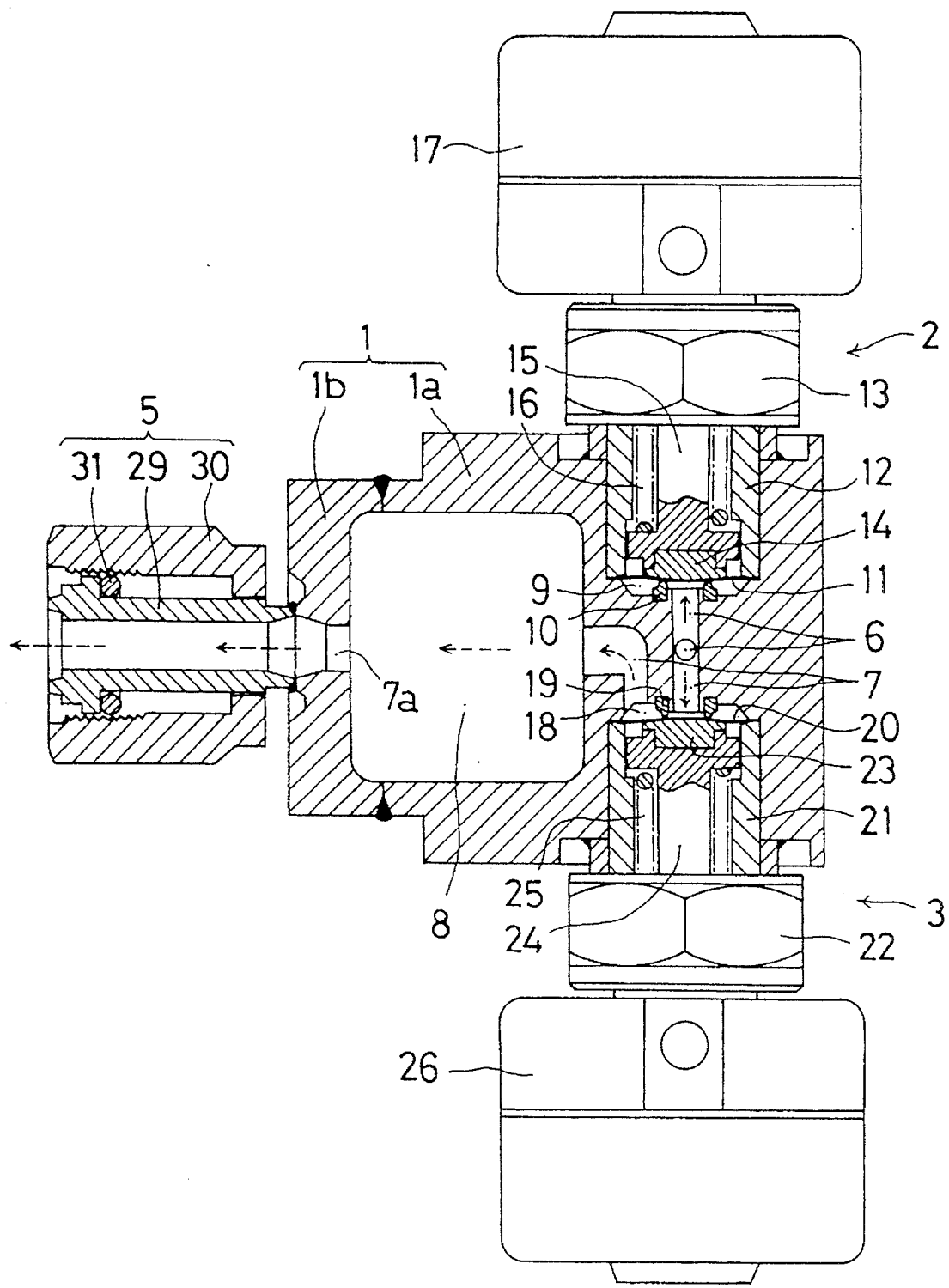
FIG. 3 is a front view, partly in section, of the valve.
Figure 4:
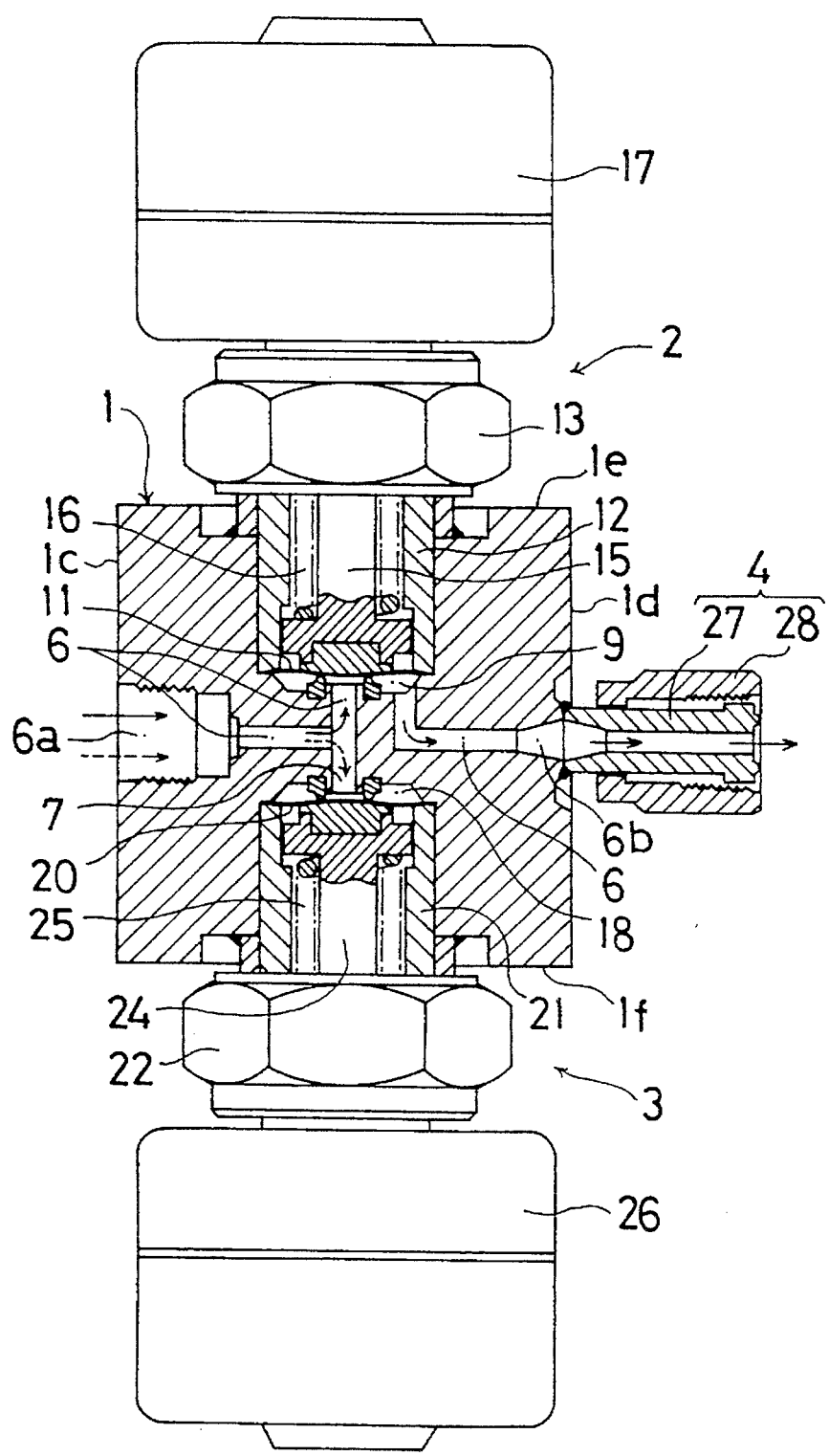
FIG. 4 is a left side view, partly in section, of the valve.

As illustrated in FIGS. 1–4, a preferred embodiment of a valve according to the present invention comprises a valve body 1, a first valve 2, a second valve 3, a first pipe coupling 4 and a second pipe coupling 5.

The body 1 comprises a generally block-shaped main body portion 1a and a plate 1b welded to the main body portion 1a. The body portion 1a has a rear side 1c (FIG. 4), a front side 1d, a top side 1e and a bottom side 1f. The body 1 may be made of stainless steel or another metal.

A gas feed passage 6 is provided within main body portion 1a. The passage 6 has a first portion with an inlet 6a, the first portion terminating at an opening in the valve seat 10 of the first valve 2. Passage 6 has a second portion with an outlet 6b, the second portion terminating at an opening in the valve chamber 9 of the first valve.

A branch passage 7 is provided within valve body 1, the branch passage having a first portion connected between the first portion of passage 6 and an opening in the valve seat 19 of the second valve 3, a second portion extending from an opening in valve chamber 18 of the second valve to a tank chamber 8, and an outlet 7a formed in plate 1b to form a passage between tank chamber 8 and the pipe coupling 5.

Valves 2 and 3 are located at the top and bottom of the valve body 1. The valves are direct touch diaphragm valves. That is, the metal diaphragm directly contacts the valve seat to block flow through the valve.

Valve 2 is provided for opening and closing gas feed passage 6 at a point downstream of the point at which branch passage 7 joins the passage 6. Valve 2 comprises valve chamber 9, an annular valve seat 10 of synthetic resin recessed in the bottom wall of the valve chamber, and a thin metal dome-shaped diaphragm 11 of stainless steel, Iconel or similar material. A valve bonnet 12 of annular form presses the periphery of diaphragm 11 against an annular land provided on body 1 so as to provide an air-tight seal between the diaphragm and body 1. A bonnet nut 13 is screwed onto the top of body 1 to press bonnet 12 against the diaphragm.

A spring 16 normally presses a valve stem 15 downwardly. The valve stem is provided with a diaphragm holder 14 at its lower end, the diaphragm holder being pressed against diaphragm 11 by the force of spring 16 so that the diaphragm presses against, and forms a seal with, the valve seat 10, thereby blocking gas flow through the valve.

A suitable actuator 17 which may, for example be a fluid actuated device, is coupled to the valve stem 15. When the actuator is energized, it moves the valve stem 15 upwardly against the force of spring 16. As the spring moves upwardly, it carries the diaphragm holder 14 so that downward pressure on the diaphragm 11 is relieved. Because of its own resilience, and the pressure of fluid in passage 6 upstream of the diaphragm, the diaphragm springs back to its dome shape so that fluid may flow from inlet 6a to outlet 6b through valve seat 10 and valve chamber 9.

Valve 3 is provided for opening and closing the branch passage 7 at a point upstream of tank chamber 8. Valve 3 comprises a valve chamber 18, a valve seat 19, a diaphragm 20, a bonnet 21, a bonnet nut 22, a diaphragm holder 23 carried by a valve stem 24, and a compression spring 25. Valve 3 is arranged and operates in the same manner as valve 2. An actuator 26 is provided for moving valve stem 24 against the force of spring 25 to open the valve.

The pipe couplings 4 and 5 are provided to facilitate connection of the valve into a gas piping system. The first coupling 4 comprises a sleeve 27 welded to valve body 1 in the region surrounding outlet 6b of the gas feed passage, and a union nut 28 which fits around the sleeve and is internally threaded for receiving the threaded end of a pipe. The second coupling 5 comprises a sleeve 29 welded to plate 1b in the region surrounding outlet 7a. A union nut 30 fits around sleeve 29 and is internally threaded for receiving the threaded end of a pipe. A seal 31 is provided around sleeve 29, the seal being clamped between the sleeve and the union nut to provide an air-tight seal when the union nut is tightened onto a pipe.

Figure 5:
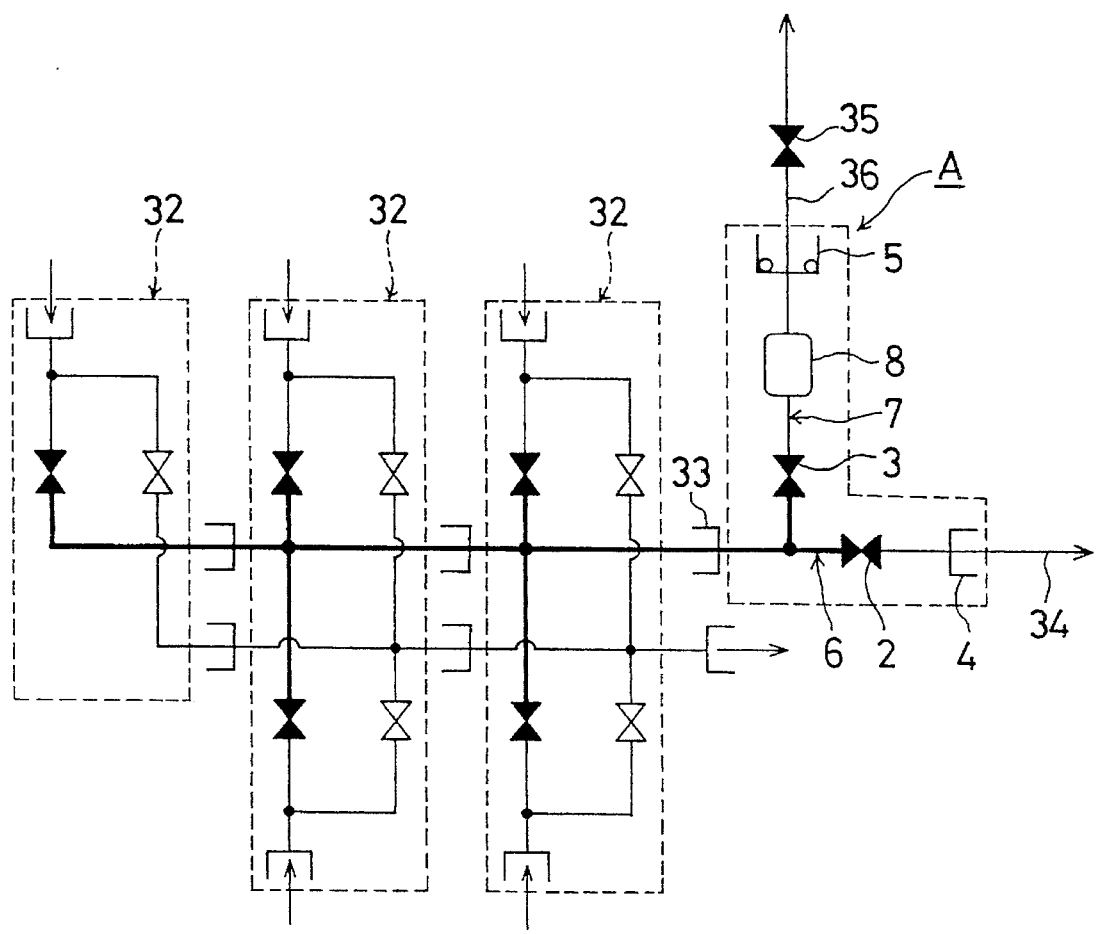
FIG. 5 is a schematic diagram of a gas piping system incorporating the block valve of FIGS. 1–4; and, FIG. 6 is a schematic diagram of a gas piping system incorporating conventional block valves without a tank chamber.
Figure 6:
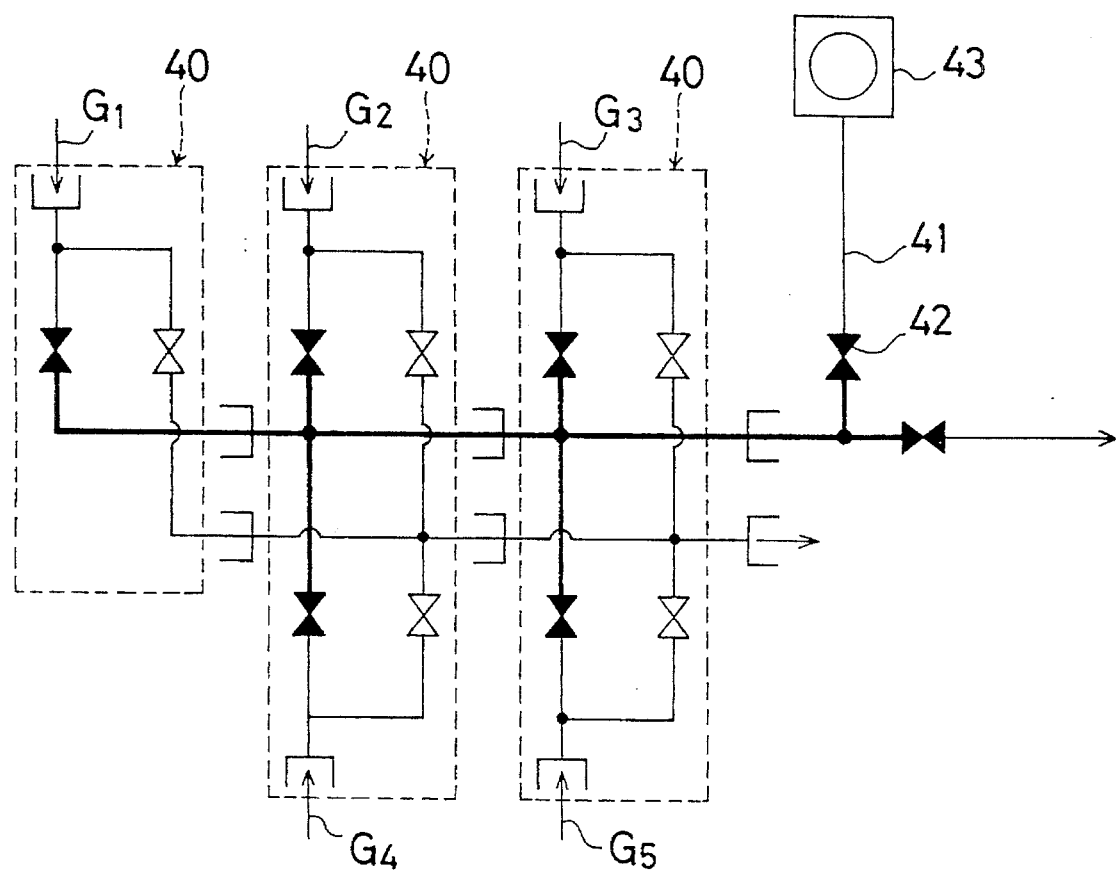

FIG. 5 illustrates the use of the block valve with a tank chamber in a gas feed system for feeding gases to a semiconductor manufacturing apparatus (not shown). The block valve A with tank chamber 8 is disposed at the secondary or downstream side of a plurality of conventional block valves 32. Inlet 6a of valve A is connected to the outlets of block valves 32 through a piping connection 33. The first pipe coupling 4, provided at the outlet 6b, is connected to a gas feed pipe which feeds gases to the semiconductor process chamber. The second pipe coupling 5, provided at the outlet 7a of branch passage 7, is connected through a branch pipe 36 and a valve 35 to a vacuum pump (not shown).

In FIG. 5, portions of the gas feed passages are represented by heavier lines than other portions. The volume of tank 8 in valve A should be greater than the total volume of the portions of the gas feed passages represented by the heavier lines.

When a first gas is to be fed into the process chamber, one of the valves 32 is opened to admit the appropriate gas.

Valve 2 is opened so that the gas flows through inlet 6a, the chamber 9 of valve 2, and out through coupling 4 to the process chamber feed line 34. Meanwhile, the vacuum pump (not shown) continuously evacuates tank chamber 8 through valve 35 to maintain a pressure of about $10^{-4}$ Torr in the chamber. Valve 3 is closed so that the first gas is not evacuated through the chamber.

When a second gas is to be fed into the process chamber, the flow of the first gas must be stopped and the portion of the piping system shown in heavier lines must be cleared of any residual first gas. The flow of the first gas is stopped by closing the appropriate block valve 32.

To clear the residual first gas, valve 2 is closed to isolate the process chamber and feed line 34. Valve 2 is closed by stopping the supply of driving fluid to the actuator 17 if the actuator is a fluid operated actuator. Valve 3 is opened by energizing actuator 26. When valve 3 is opened, a path is formed from connection 33, inlet 6a, branch passage 7 and the chamber 9 of the valve 3 to the tank chamber 8. The vacuum in the tank chamber begins sucking the residual first gas from the portion of the piping system shown in heavier lines in FIG. 5, and the vacuum pump sucks the gas from tank chamber 18 through pipe coupling 5 and exhaust line 36.

After allowing sufficient time for the residual first gas to be evacuated, valve 3 is closed and valve 2 opened. The appropriate block valve 32 is then opened to admit the second gas to the process chamber.

From the foregoing description it is seen that the present invention provides a block valve which is capable of rapidly evacuating residual gas from a piping system because of the vacuum maintained in the tank chamber 8. Although the block valve includes two valves and a tank chamber, it need not be any larger than a conventional block valve. Therefore, a large space for installation of the block valve is not required.

A preferred embodiment of the invention has been described in detail by way of illustration. In an alternative embodiment, the valve 35 may be closed after each evacuation of tank chamber 8 and reopened when it is time to discharge residual gas. Valves 2 and 3 need not be direct touch type metal diaphragm valves but may be another type of valve. The valves need not be alike. The actuators 17 and 26 need not be fluid actuators but may instead be motors or even manual handles. In some embodiments, the pipe couplings 4 and/or 5 may be replaced with other forms of couplings such as threaded inlets and outlets similar to that provided at inlet 6a. Obviously, other modifications and substitutions may be made in the described embodiment without departing from the spirit and scope of the invention as defined by the appended claims.

I claim:

1. A block valve comprising a valve body having formed therein a tank chamber in which a vacuum is maintained, a gas feed passage having a gas feed inlet and a gas feed outlet, a branch passage having a portion connecting said gas feed passage to said tank chamber and a branch outlet extending from said tank chamber to a side of said valve body, a first valve mounted on said valve body for selectively opening and closing said gas feed passage at a point downstream of where said branch passage connects with said gas feed passage, and a second valve mounted on said valve body for selectively opening and closing said branch passage at a point between said tank chamber and where said branch passage connects with said gas feed passage, said vacuum being such that when said first valve is closed and said second valve is opened, gas in said gas feed passage and said branch passage upstream of the first and second valves is sucked into said tank chamber.

2. A block valve as claimed in claim 1 in combination with means for evacuating said tank chamber through said branch passage outlet.

3. A block valve as claimed in claim 1 in combination with means for continuously evacuating said tank chamber.

4. A block valve as claimed in claim 1 in combination with means for evacuating said tank chamber to thereby produce a vacuum at said gas feed passage inlet when said second valve opens said branch passage.

5. A block valve as claimed in claim 1 wherein said first and second valves each have a metal diaphragm for directly contacting a valve seat to thereby selectively open and close a passage.

6. A block valve as claimed in claim 5 and further comprising actuator means for selectively opening said valves.

7. A block valve as claimed in claim 6 wherein said actuator means comprises a pneumatic actuator.

8. A block valve as claimed in claim 6 wherein said actuator means comprises a drive motor.

9. A block valve as claimed in claim 6 wherein said actuator means comprises a manually operated controller.

10. A block valve as claimed in claim 1 wherein said tank chamber has a volume at least as great as the total internal volume of said gas feed passage and said branch passage upstream of the first and second valves.

11. A block valve comprising a valve body having formed therein a tank chamber, a gas feed passage having a gas feed inlet and a gas feed outlet, a branch passage having a portion connecting said gas feed passage to said tank chamber and a branch outlet extending from said tank chamber to a side of said valve body, a first valve mounted on said valve body for selectively opening and closing said gas feed passage at a point downstream of where said branch passage connects with said gas feed passage, and a second valve mounted on said valve body for selectively opening and closing said branch passage at a point between said tank chamber and where said branch passage connects with said gas feed passage;

valve means connected by piping to said gas feed inlet for selectively supplying a first gas or a second gas to said gas feed passage; and, vacuum means for continuously maintaining a vacuum in said tank chamber whereby when said valve means and said first valve are all closed to block gas flow through said piping and said gas feed passage and said second valve is opened, the vacuum in said tank chamber sucks from said piping, said branch passage and said gas feed passage any residual first or second gas located downstream of said valve means and upstream of the first and second valves.

12. A block valve, valve means and vacuum means as claimed in claim 11 wherein said tank chamber has an internal volume at least as great as the total volume of said piping, said branch passage and said gas feed passage downstream of said valve means and upstream of the first and second valves.

* * * * *